United States Patent
Rakshit et al.

(10) Patent No.: US 11,442,442 B2
(45) Date of Patent: Sep. 13, 2022

(54) SENSOR EVENT COVERAGE AND ENERGY CONSERVATION

(71) Applicant: INTERNATIONAL BUSINESS MACHINES CORPORATION, Armonk, NY (US)

(72) Inventors: Sarbajit K. Rakshit, Kolkata (IN); John D. Wilson, League City, TX (US); Jeremy R. Fox, Georgetown, TX (US); Shikhar Kwatra, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 17/019,818

(22) Filed: Sep. 14, 2020

(65) Prior Publication Data

US 2022/0083038 A1    Mar. 17, 2022

(51) Int. Cl.
    *G05B 23/02*    (2006.01)
    *G06N 20/00*    (2019.01)
    (Continued)

(52) U.S. Cl.
    CPC ....... *G05B 23/0218* (2013.01); *G05B 23/024* (2013.01); *G06K 9/6257* (2013.01);
    (Continued)

(58) Field of Classification Search
    CPC .... H04L 67/12; H04Q 9/02; H04Q 2213/002; H04W 4/38; G05B 23/0218;
    (Continued)

(56) References Cited

U.S. PATENT DOCUMENTS 9,037,181 B2    5/2015    Keshavarzian
11,379,766 B2 *  7/2022   Ba .................... G06Q 10/06313
(Continued)

FOREIGN PATENT DOCUMENTS

CN    101458325 A    6/2009
CN    109791649 A    5/2019
(Continued)

OTHER PUBLICATIONS

Attiah, et al., "ADP: An Adaptive Feedback Approach for Energy-Efficient Wireless Sensor Networks," IEEE, 2016 International Conference on Computing, Networking and Communications (ICNC), Kauai, HI, doi: 10.1109/ICCNC.2016.7440565, https://ieeexplore.ieee.org/document/7440565, Feb. 15-18, 2016, pp. 1-7.

(Continued)

*Primary Examiner* — Arvin Eskandarnia
*Assistant Examiner* — Chhian (Amy) Ling
(74) *Attorney, Agent, or Firm* — Tihon Poltavets

(57) ABSTRACT

A method for sensor event coverage and energy conservation includes receiving device sensor data for a plurality of sensors in a sensor network. The method further includes identifying one or more anomalies in the device sensor data that indicate one or more sensors from the plurality of sensors were acquiring data during an event for a specific point in time and identifying movement patterns for the plurality of sensors based on the one or more anomalies. The method further includes responsive to updating base engagement profiles for the plurality of sensors based on the one or more anomalies and the movement patterns, activating based on the updated base engagement profiled, a first sensor from the plurality of sensors.

17 Claims, 7 Drawing Sheets

(51) Int. Cl.

| | | |
|---|---|---|
| *H04L 67/12* | (2022.01) | |
| *G06K 9/62* | (2022.01) | |
| *G16Y 40/35* | (2020.01) | |
| *H04Q 9/02* | (2006.01) | |
| *G16Y 20/30* | (2020.01) | |
| *H04W 4/38* | (2018.01) | |
| *G16Y 40/20* | (2020.01) | |

(52) U.S. Cl.
CPC ........... *G06K 9/6288* (2013.01); *G06N 20/00* (2019.01); *G16Y 20/30* (2020.01); *G16Y 40/35* (2020.01); *H04L 67/12* (2013.01); *H04Q 9/02* (2013.01); *H04W 4/38* (2018.02); *G16Y 40/20* (2020.01); *H04Q 2213/002* (2013.01)

(58) Field of Classification Search
CPC .. G05B 23/024; G06K 9/6257; G06K 9/6288; G06N 20/00; G16Y 20/30; G16Y 40/35; G16Y 40/20
See application file for complete search history.

(56) References Cited

U.S. PATENT DOCUMENTS

| | | | |
|---|---|---|---|
| 2016/0292584 A1 | 10/2016 | Weinberg | |
| 2018/0046975 A1* | 2/2018 | Jones | ................... G06Q 20/203 |
| 2018/0174671 A1* | 6/2018 | Cruz Huertas | ........ G16H 10/60 |
| 2019/0164405 A1* | 5/2019 | Barcala | ................ G06F 1/3209 |

FOREIGN PATENT DOCUMENTS

| | | |
|---|---|---|
| EP | 3457635 A1 | 3/2019 |
| WO | 2019158954 A1 | 8/2019 |

OTHER PUBLICATIONS

Bokar, et al., "Target Tracking by Using Prediction and Sleep Scheduling in Sensor Networks," International Journal of Research Studies in Science, Engineering and Technology [IJRSSET], vol. 1, Issue 1, https://ijrsset.org/pdfs/v1-i1/12.pdf, Apr. 2014, pp. 79-83.
Disclosed Anonymously, "Edge Computing Market Worth $43.4 Billion by 2027 CAGR: 37.4%," Grandview Research, https://www.grandviewresearch.com/press-release/global-edge-computing-market, Mar. 2020, pp. 1-7.
Enami, et al., "Neural Network Based Energy Efficiency in Wireless Sensor Networks: A Survey," Researchgate, International Journal of Computer Science & Engineering Survey (IJCSES), vol. 1, No. 1, DOI: 10.5121/ijcses.2010.1104, https://www.researchgate.net/publication/260321203, Aug. 2010, pp. 39-55.
Mell et al., "The NIST Definition of Cloud Computing", National Institute of Standards and Technology, Special Publication 800-145, Sep. 2011, pp. 1-7.
Nan, et al., "CDSWS: Coverage-Guaranteed Distributed Sleep/Wake Scheduling for Wireless Sensor Networks," Springeropen Journal, EURASIP Journal on Wireless Communications and Networking, 2012:44, https://jwcn-eurasipjournals.springeropen.com/track/pdf/10.1186/1687-1499-2012-44, 2012, pp. 1-14.
Paoli, et al., "Poster Abstract: MagoNode++: A Wake-Up-Radio-Enabled Wireless Sensor Mote for Energy-Neutral Applications," 2016 15th ACM/IEEE International Conference on Information Processing in Sensor Networks (IPSN), Vienna, doi: 10.1109/IPSN.2016.7460708, https://ieeexplore.ieee.org/stamp/stamp.jsp?tp=&arnumber=7870667, 2016, pp. 1-2.
Ye, et al., "A Self-Adaptive Sleep/Wake-Up Scheduling Approach for Wireless Sensor Networks," IEEE Transactions on Cybernetics, vol. 48, No. 3, https://ieeexplore.ieee.org/stamp/stamp.jsp?tp=&arnumber=7870667, Mar. 2018, pp. 979-992.
International Search Report and Written Opinion, PCT/CN2021/118003, International filing date: Sep. 13, 2021, dated Dec. 2, 2021, Applicant's file reference: F21W9957, pp. 1-8.

\* cited by examiner

SENSOR EVENT COVERAGE AND ENERGY CONSERVATION

BACKGROUND

This disclosure relates generally to sensor networks, and in particular to managing a sensor network to provide event coverage while minimizing energy consumption.

Interrelated computing devices, also referred to as Internet of Things (IoT) devices, are often battery operated and deployed in remote areas where there is limited or no access to an electrical infrastructure. Battery operated IoT devices are able to capture sensor data and transmit the sensor data via a network to a remote device for evaluation. Since, battery operated IoT devices are not connected to the electrical infrastructure, battery replacement or recharging on a periodic basis is required to ensure data is captured and events are registered. Though an IoT device can harvest energy from the environment through solar and wind to periodically recharge the battery, continuous charge cycles reduces battery capacity over the expected life of the battery.

SUMMARY

Embodiments in accordance with the present invention disclose a method, computer program product and computer system for sensor event coverage and energy conservation, the method, computer program product and computer system can receive device sensor data for a plurality of sensors in a sensor network. The method, computer program product and computer system can receive device sensor data for a plurality of sensors in a sensor network. The method, computer program product and computer system can identify one or more anomalies in the device sensor data that indicate one or more sensors from the plurality of sensors were acquiring data during an event for a specific point in time. The method, computer program product and computer system can identify movement patterns for the plurality of sensors based on the one or more anomalies. The method, computer program product and computer system can responsive to updating base engagement profiles for the plurality of sensors based on the one or more anomalies and the movement patterns, activate based on the updated base engagement profiled, a first sensor from the plurality of sensors.

DETAILED DESCRIPTION

An Internet of Things (IoT) sensor network utilizes multiple interrelated computing devices for providing event coverage to capture data, where not every IoT sensor in the IoT sensor network is required to capture and send data thus consuming energy. Embodiments of the present invention manage an IoT sensor network to activate a portion of sensors in an event coverage area based on engagement profile to capture and send data to provide the event coverage. Instances where a portion of sensors from the IoT sensor network are not required to provide event coverage based on the engagement profiles, the portion of sensors are placed in a low energy consumption state (e.g., sleep mode). In the low energy consumption states, the portion of sensors of the IoT network sensor can receive an instruction to activate but are not required to capture and send data, since the portion of sensors are outside an event coverage area.

Figure 1:
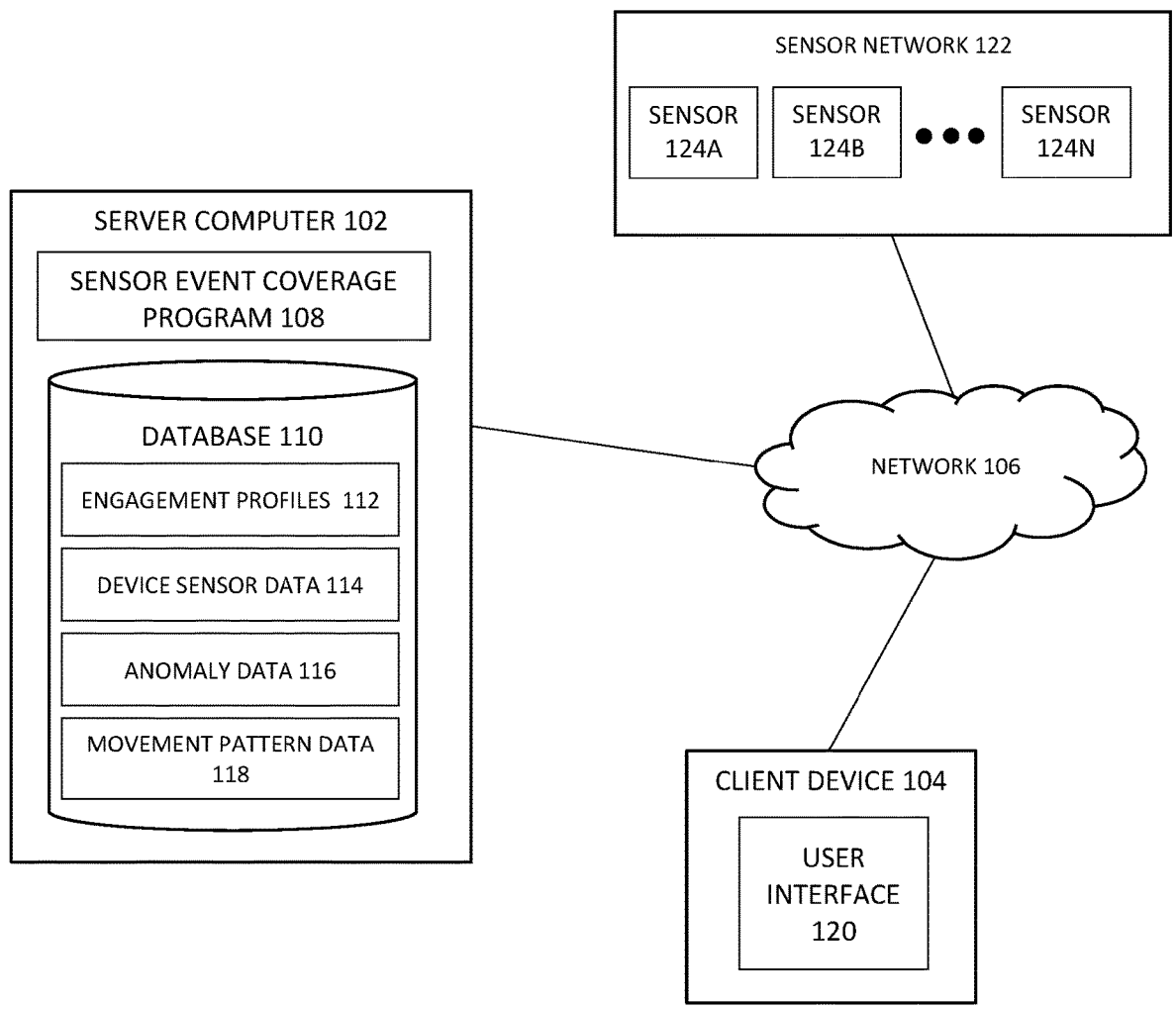
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client device 104, and sensor network 122 all interconnected over network 106.

Server computer 102 may be a desktop computer, a laptop computer, a tablet computer, a specialized computer server, a smartphone, or any computer system capable of executing the various embodiments of sensor event coverage program 108. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes sensor event coverage program 108 capable of communicating with database 110, where database 110 includes device engagement profiles 112, sensor data 114, anomaly data 116, and movement pattern data 118.

Client device 104 may be a cellphone, smartphone, smartwatch, laptop, tablet computer, or any other electronic device capable of communicating via network 106. In general, client device 104 represents one or more programmable electronic devices or combination of programmable electronic devices capable of executing machine readable program instructions and communicating with other computing devices (not shown) within distributed data processing environment via a network, such as network 106. In one embodiment, client computing device 104 represents one or more devices associated with a user. Client device 104 includes user interface 120, where user interface 120 enable a user of client device 104 to interact with sensor event coverage program 108 on server computer 102.

Sensor event coverage program 108 utilizes engagement profiles 112 for a plurality of sensors designated as sensor 124A, 124B, and 124N in sensor network 122 to determine when to activate and deactivate a particular sensor in sensor network 122 to provide event coverage. In this embodiment, one or more engagement profiles 112 from a plurality of engagement profiles 112 are associated with sensor (e.g., sensor 124A) from the plurality of sensors. It is to be noted, sensor 124A represents a first sensor, sensor 124B represents a second sensor, and sensor 124N represents a final sensor in sensor network 122, where sensor 124N can for example represent a twentieth sensor or a forty-fifth sensor in sensor network 122. Event coverage represents instances where sensor event coverage program 108 is to activate one or more sensors in sensor network 122 to capture and send data during an occurrence of an event. Sensor event coverage program 108 utilizes known locations for sensors 124A, 124B, and 124N and determined event coverage areas to establish engagement profiles 112.

Sensor event coverage program 108 determines base engagement profiles 112 for sensors 124A, 124B, and 124N in sensor network 122, where sensor event coverage program 108 utilizes time-based activation schedules and/or user defined activation preferences for sensors 124A, 124B, and 124N. Sensor event coverage program 108 receives device sensor data 114 from each sensor (e.g., sensor 124B) in sensor network 122, where device sensor data 114 indicates a time of captured data, a reason for captured data, one or more data types captured, and one or more data types sent, for each sensor 124A, 124B, and 124N. Sensor event coverage program 108 identifies anomalies in the received device sensor data 114 and identifies movement patterns based on the identified anomalies. Subsequently, sensor event coverage program 108 stores device sensor data 114, stores the identified anomalies as anomaly data 116, and stores the identified movement patterns as movement pattern data 118. Sensor event coverage program 108 updates the base engagement profiles 112 for sensor network 122 through an iteration of a machine learning process, based on received device sensor data 114, anomaly data 116, and movement pattern data 118.

Sensor event coverage program 108 determines whether to initialize engagement profiles 112 for sensors 124A, 124B, and 124N in sensor network 122. Responsive to sensor event coverage program 108 determining to initialize engagement profiles 112, sensor event coverage program 108 activates each sensor in sensor network 122 based on engagement profiles 112. Responsive to sensor event coverage program 108 determining not to initialize sensor event coverage program 108, sensor event coverage program 108 reverts back to receiving additional device sensor data 114 to perform another iteration of the machine learning process to further update engagement profiles 112. As sensor event coverage program 108 activates and deactivates each sensor in sensor network 122, sensor event coverage program 108 updates engagement profiles 112 for sensor network 122 based on received device sensor data 114.

Database 110 is a repository for data utilized by sensor event coverage program 108 such as, engagement profiles 112, device sensor data 114, anomaly data 116, and movement pattern data 118. In the depicted embodiment, database 110 resides on server computer 102. In another embodiment, database 110 may reside on client device 104 or elsewhere within distributed data processing environment provided sensor event coverage program 108 has access to database 110. Database 110 can be implemented with any type of storage device capable of storing data and configuration files that can be accessed and utilized by generated design program 108, such as a database server, a hard disk drive, or a flash memory.

Engagement profiles 112 for sensors 124A, 124B, and 124N provide instructions for activation and deactivation of sensors 124A, 124B, and 124N, where an activation of a sensor indicates the sensor is capturing data and transmitting data and a deactivation of a sensor indicates the sensor is in a low power consumption state (e.g., sleep mode). Device sensor data 114 includes information such as, a time of captured data, a reason for captured data, one or more data types captured, and one or more data types sent, for each sensor 124A, 124B, and 124N. Anomaly data 116 includes data captured by a specific sensor (e.g., sensor 124A) in sensor network 122 that sensor event coverage program 108 identifies as irregular relative to data captured by other sensors (e.g., sensor 124B and 124N) in sensor network 122. Movement pattern data 118 includes movement patterns or changes across sensor network 122 that sensor event coverage program 108 identifies based on device sensor data 114 and anomaly data 116.

In general, network 106 can be any combination of connections and protocols that will support communications between server computer 102, client device 104, and sensor network 122. Network 106 can include, for example, a local area network (LAN), a wide area network (WAN), such as the internet, a cellular network, or any combination of the preceding, and can further include wired, wireless, and/or fiber optic connections. In one embodiment, sensor event coverage program 108 can be a web service accessible via network 106 to a user of client device 104. In another embodiment, sensor event coverage program 108 may be operated directly by a user of server computer 102. Sensor network 122 can be any combination of connections and protocols that will support communications between sensor 124A, 124B, and 124N, and network 106. Sensor network 122 can include, for example, a local area network (LAN), a wide area network (WAN), such as the internet, a cellular network, or any combination of the preceding, and can further include wired, wireless, and/or fiber optic connections, independent of network 106.

Figure 2:
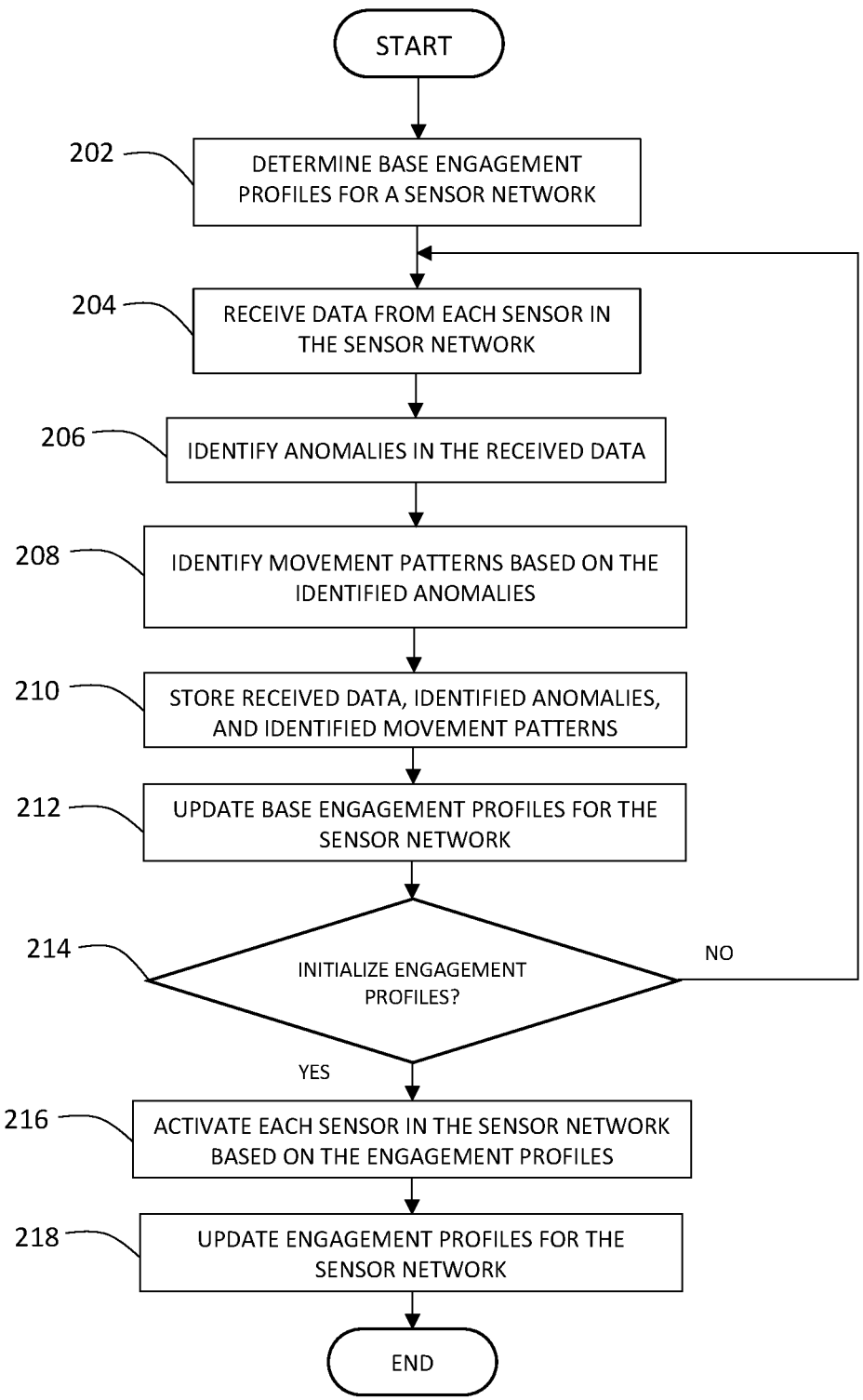
FIG. 2 is a flowchart depicting operational steps of a sensor event coverage program, on a server computer within the distributed data processing environment of FIG. 1, for providing sensor network event coverage, in accordance with an embodiment of the present invention.

FIG. 2 is a flowchart depicting operational steps of a sensor event coverage program, on a server computer within the distributed data processing environment of FIG. 1, for providing sensor network event coverage, in accordance with an embodiment of the present invention.

For a training phase, each sensor in a sensor network is continuously capturing sensor data and based on an analysis of the captured sensor data, a sensor event coverage program identifies anomalies in the captured sensor data. Each sensor in the sensor network includes a unique identification marker and respective credentials for each captured sensor data is stored in a database. As a server computer with the sensor event coverage program receives sensor data from each sensor in the sensor network, the unique identification marker for each sensor is included for associating a particular sensor with the captured sensor data. The sensor event coverage program can identify movement patterns based on the identified anomalies. A sensor data value matrix for different points in time(n) are fed to a neural network model of the sensor event coverage program. In one embodiment, a value can be normalized to "0" and "1" representing a nonactive sensor and an active sensor, respectively. A nonactive sensor can represent a sensor that is not acquiring data at a specific point in time(n) and an active sensor can represent a sensor that is acquiring data at a specific point in time(n). In another embodiment, a value in the sensor data value matrix can include a sensor reading (e.g., 25° C.) for a specific sensor. In yet another embodiment, a value in the sensor data value matrix can indicate whether a specific sensor is operating in a normal state or if an anomaly detection state. A visual representation of an example sensor data value matrix is discussed in further detail with regards to FIGS. 3A-3C.

The sensor event coverage program can deploy dimension reduction by reducing redundant features to make classification easier and feed the input features to the neural network model. A dimension reduction unsupervised learning method (e.g., Monte Carlo Method) can enable reducing or eliminating features over time or in this example, reducing the dependency on one or more of the sensor readings. The dimension reduction unsupervised learning method obtains a greater accuracy and expedites the process of adjusting weights and training the model faster. The neural network output is compared to the sensor value data for time(n+1), as another iteration in the training process and weights are adjusted as the neural network is trained with each iteration (i.e., time(n+2), time (n+3), . . . ). The sensor event coverage program determines when the neural network has been adequately trained to deliver what the expect active sensor set should be compared to a current time snippet for the active sensor set.

For an operation phase, instances when the sensor network is not gathering data (i.e., no events occurring), the neural network has no data to infer patterns and overlaid on top of the prediction framework is a scouting mode. The scouting mode activates a minimum set of sensors in the sensor network to gather data, where the minimum set of sensors represents a subset of sensors in the sensor network. The subset of sensors in the sensor network can be selected based on user defined designated scout sensors, sensors with most activity, sensors that are anomaly detection points, and randomly. During an operation mode, scout data signals an even and time(n) data is present for at least one sensor in the sensor network. The neural network of the sensor event coverage program inputs sensor value data for time(n), internal layers with trained weights calculates output values, and the neural network of the sensor event coverage program outputs time(n+1) sensor activation set. The sensor event coverage program utilizes the sensor activation set to send a wake signal to activate a sensor and a sleep signal to deactivate a sensor accordingly.

Sensor event coverage program 108 determines base engagement profiles for a sensor network (202). In this embodiment, sensor event coverage program 108 determines base engagement profiles for the sensor network by identifying whether any sensor in the sensor network utilizes a time-based activation schedule and/or user defined activation preference. In one example of a time-based activation schedule, sensor event coverage program 108 identifies that the sensors in the sensor network can activate and deactivate based on set time internals (e.g., every twenty minutes), where the sensors activate at a first time internal to acquire data and subsequently deactivate until a second time interval is reached. In another example of a time-based activation schedule, sensor event coverage program 108 identifies that the sensors in the sensor network can active and deactivate for certain hours in a day (e.g., business hours), where the sensors are active between the hours of 8 AM and 6 PM and nonactive for all other hours. In one example of a user defined activation preference, sensor event coverage program 108 identifies that a user has grouped a subset of sensors in the sensor network, where a sensor that activates in the subset results in the activation of the remaining sensors in the subset and a sensor that deactivates in the subset results in the deactivation of the remaining sensors in the subset. In another example of a user defined activation preference, sensor event coverage program 108 identifies that a user has specified that a sensor remain activate for readings in a given range (e.g., X>15° C.), where the sensor can deactivate if the reading for the sensor is no longer in the given range (e.g., X≤15° C.). Sensor event coverage program 108 utilizes the identified time-based activation schedules and user defined activation preferences to determine a base engagement profile for each sensor in the sensor profile to provide event coverage.

Sensor event coverage program 108 receives data from each sensor in the sensor network (204). Each sensor in the sensor network includes a unique identification marker for identifying a sensor type and known location, where the unique identification marker and respective credentials for device sensor data captured by each sensor is stored in a database. The device sensor data can include an acquired reading (e.g., temperature, humidity, sound), an indication of activation (i.e., activated or deactivated), an operational state (i.e., normal state, anomaly state, error state), a timestamp for an acquired reading, and a location for an acquired reading. Sensor event coverage program 108 receives the device sensor data for time(n) in the form of a data value matrix, where each value in the data value matrix is represented by the acquired reading of a single sensor in the sensor network. Sensor event coverage program 108 receives the device sensor data with the unique identification marker from each sensor in the sensor network and utilizes the received sensor data to identify anomalies. Sensor event coverage program 108 can utilize the location for an acquired reading to create a visual overlay on a map, where sensor event coverage program 108 can display the overlay on the map with the sensor locations on a client device associated with the user. The user can select one or more sensors in the sensor network to exclude from subsequently updating the base engagement profiles, discussed in further detail with regards to (212).

Sensor event coverage program 108 identifies anomalies in the received data (206). In this embodiment, sensor event coverage program 108 identifies anomalies for one or more sensors in the sensor network by comparing the received device sensor data for a single sensor in the sensor network to the remaining sensors in the sensor network for time(n). An anomaly that sensor event coverage program 108 identifies in the received device sensor data for a sensor in the sensor network, indicates that the sensor was active and acquiring data during an event for time(n). An event represents an occurrence in a vicinity (i.e., event coverage area) of the sensor that requires the activation of the sensor to acquire data and/or perform an action. In one example, a plurality of camera devices is positioned in a retail location, where each camera device from the plurality of camera devices includes a motion sensor for activating a respective camera. Sensor event coverage program 108 identifies an anomaly in the plurality of camera devices that indicates a first camera device activates in conjunction with a second camera device at time(n). However, in a subsequent iteration of receiving device sensor data, sensor event coverage program 108 identifies an anomaly in the plurality of camera devices that indicates a first camera device activates in conjunction with a third camera device at time(n+1), but the second camera device remains inactive. Sensor event coverage program 108 identifies and complies the identified anomalies for the plurality of camera at the retail location at multiple points in time (i.e., time(n+1), time(n+2), time(n+3) . . . ).

In another example, a plurality of temperature sensors is positioned in a crop field, where each temperature from the plurality of temperature sensors acquires a temperature reading at time(n) and a temperature threshold (e.g., x>25° C.) to active a portion of an irrigation system in the vicinity of the temperature sensor. The activation of a portion of the irrigation system can include opening an electronically controlled water valve to ensure the soil in a portion of the crop field in the vicinity of the temperature sensor with a reading above the temperature threshold maintains a certain moisture level. Sensor event coverage program 108 identifies an anomaly in the plurality of temperature sensor data that indicates a first temperature sensor registered a first reading above the temperature threshold at time(n). However, in a subsequent iteration of receiving temperature sensor data, sensor event coverage program 108 an anomaly in the plurality of temperature sensor data that indicates a first, a second, and a third temperature sensor registered a first, a second, and a third reading above the temperature threshold at time(n+1). Sensor event coverage program 108 identifies and complies the identified anomalies for the plurality of temperature sensors positioned in the crop field at multiple points in time (i.e., time(n+1), time(n+2), time(n+3) . . . ).

Sensor event coverage program 108 identifies movement patterns based on the identified anomalies (208). Sensor event coverage program 108 identifies movement patterns based on a comparison of identified anomalies for received device sensor data at time(n) to any previously identified anomalies for received device sensor at time(n−1), time(n−2), and so on. For discussion purposes, movement patterns represent instances of an activation of a subset of sensors in the sensor network, where the subset of active sensors from the sensor network can change at different points in time (e.g., time(n−1) vs time(n) vs time(n+1)). In one example, where a plurality of camera devices is positioned in a retail location, sensor event coverage program 108 identified an anomaly in the plurality of camera devices that indicates a first camera device activates in conjunction with a second camera device at time(n). Sensor event coverage program 108 also previously identified anomalies in the plurality of camera device that indicate the first camera device activates in conjunction with a third camera device at time(n−1) and the first camera device activates in conjunction with a fourth camera device at time(n−2). Sensor event coverage program 108 compares the identified anomaly at time(n) to the previously identified anomalies at time(n−1) and time(n−2), to identify movement patterns for the sensors in the sensor network. Sensor event coverage program 108 utilizes known locations for each of the camera device with motion sensors in the sensor network to determine when and how each of the motion sensors in the sensor network activate and deactivate with relation to one another.

In another example, where a plurality of temperature sensors is positioned in crop field, sensor event coverage program 108 identified an anomaly in the plurality of temperature sensors that indicates a first temperature sensor registered a first reading above the temperature threshold at time(n). Sensor event coverage program 108 also previously identified anomalies in the plurality of temperature sensors that indicates a second temperature sensor registered a second reading above the temperature threshold at time(n−1), a third temperature sensor registered a third reading above the temperature threshold at time(n−2), and a fourth temperature sensor registered a fourth reading above the temperature threshold at time(n−3). Sensor event coverage program 108 compares the identified anomaly at time(n) to the previously identified anomalies at time(n−1), time(n−2), and time(n−3), to identify movement patterns for the sensors in the sensor network. Sensor event coverage program 108 utilizes known locations for each of the temperature sensors in the sensor network to determine when and how each of the temperature sensors in the sensor network activate and deactivate with relation to one another.

Sensor event coverage program 108 stores received data, the identified anomalies, and the identified movement patterns (210). Utilizing the unique identification markers for each sensor in the sensor network and an associated time stamp, sensor event coverage program 108 stores the received sensor data, the anomaly data, and the movement pattern data for the sensor network at time(n) in a database. Storing the combined data for the sensor network at time(n) represents a single iteration of compiling data for a machine learning process for updating the base engagement profiles for the sensor network established in (202). Preceding instances of storing the combined data for the sensor network at time(n−1) and subsequent instances of storing the combined data for the sensor network at time(n+1), each represent another iteration of compiling data for the machine learning process for continuously updating the base engagement profiled for the sensor network established in (202).

Sensor event coverage program 108 updates base engagement profiles for the sensor network (212). Sensor event coverage program 108 updates the base engagement profiles for the sensor network based on the received sensor data, the anomaly data, and the movement pattern data for each sensor in the sensor network. As previously discussed, the engagement profiles provide instructions for activation and deactivation of each sensor in the sensor network for providing event coverage at a specific point in time, where an activation of a sensor indicates the sensor is capturing data and transmitting data and a deactivation of a sensor indicates the sensor is in a low power consumption state (e.g., sleep mode). In one example, sensor event coverage program 108 previously determined base engagement profiles based on a time-based activation schedule for motion sensors associated with camera device in the sensor network activate and deactivate for certain hours in a day, where the motion sensors are active between the hours of 8 AM and 6 PM and nonactive for all other hours. However, based on multiple iterations of the machine learning process, sensor event coverage program 108 identified movement patterns for the motion sensors in the sensor network that indicated that only a portion of the motion sensors in the sensor network were actively acquiring data at specific points in time (e.g., time(n−1), time(n), time(n+1)) during the certain hour in the day. Sensor event coverage program 108 updates the base engagement profiles by combining the time-based activation schedule with the identified movement patterns for the sensor in the sensor network. As a result, only a portion of the motion sensors in the sensor network activate for a specific point in time between the hours of 8 AM and 6 PM. It is to be noted, sensor event coverage program 108 also identifies which portion of motion sensors were activate at a specific point in time, where a first portion of motion sensors in the sensor network are activate at time(n−1) and a second portion of motion of motion sensors are activate in sensor network are activate at time(n). One or more sensors in the first portion of motion sensors can be identical to one or more sensors in the second portion of motion sensors.

In another example, sensor event coverage program 108 previously determined base engagement profiles based on both a time-based activation schedule a user defined activation preference for activating temperature sensors in a sensor network. Sensor event coverage program 108 previously determined the time-based activation schedule requires that each temperature in the temperature sensor network is to be activated every 30 minutes to acquire a temperature reading. Sensor event coverage program 108 previously determined the user defined activation preference includes activating a subset of temperature sensors in the sensor network when a temperature reading from a specific temperature sensor in the subset is in a given range (e.g., X>15° C.) and deactivating the subset of temperature sensors in the sensor network when the temperature reading from the specific temperature sensor in the subset is outside the given range (e.g., X≤15° C.). Based on multiple iteration of the machine learning process, sensor event coverage program 108 identified movement patterns for the temperature sensors in the sensor network that indicated the temperature sensors in the sensor network were only acquiring data during daylight hours when an ambient temperature was in the given range. Furthermore, sensor event coverage program 108 identified movement patterns for the temperature sensors in the sensor network that indicated only a portion of the subset of temperature sensors were acquiring data in the given range and a remaining portion of the subset of temperature sensor were acquiring data outside the given range. Sensor event coverage program 108 updates the base engagement profiles for the sensor network based on the identified movement patterns to further reduce when the temperature sensors are active for acquiring data (i.e., during daylight hours) and to further reduce the subset of temperature sensors to the identified portion of the subset of temperature sensors that are to be activated to acquire temperature reading data.

Sensor event coverage program 108 determines whether to initialize the engagement profiles for the sensor network (decision 214). In one embodiment, sensor event coverage program 108 utilizes a total iteration count (e.g., one hundred iterations) for the machine learning process to determine whether enough device sensor data was received for various points in time to establish engagement profiles for the sensors in the sensor network. In another embodiment, sensor event coverage program 108 utilizes a stabilization iteration count (e.g., ten iterations) for the machine learning process, where the stabilization iteration count represents an amount of data collected at the various points in time where there were no updates to the engagement profiles. In the event sensor event coverage program 108 determines to initialize the engagement profiles for the sensor network ("yes" branch, decision 214), sensor event coverage program 108 activates each sensor in the sensor network based on the engagement profiles (216). In the event sensor event coverage program 108 determines not to initialize the engagement profiles for the sensor network ("no" branch, decision 214), sensor event coverage program 108 performs another iteration of the machine learning process and reverts back to receiving additional data at time(n+1) from each sensor in the sensor network to further update the engagement profiles for the sensor network with adjustments.

Sensor event coverage program 108 activates each sensor in the sensor network based on the engagement profiles (216). For each point in time, sensor event coverage program 108 activate each sensor in the sensor network based on the engagement profiles and similarly deactivates any sensors based on the engagement profiles. The engagement profiles span various durations and depend on the intended usage of the sensor network. In one example, sensor event coverage program 108 activates and deactivates a motion sensor associated with a camera device in a retail location according to engagement profiles created for seven days, where after seven days the engagement profiles continuously cycle every seven days. In another example, sensor event coverage program 108 activates and deactivates temperature sensors in a crop field according to engagement profiled created for every day of the year, since seasonal and solar patterns change daily affecting an activation of temperature sensors in the crop field.

Sensor event coverage program 108 updates the engagement profiles for the sensor network (218). In one example, sensor event coverage program 108 activates and deactivates a motion sensor associated with a camera device in a retail location according to engagement profiles created for seven days, where after seven days the engagement profiles continuously cycle every seven days. As sensor event coverage program 108 utilizes the engagement profiles for the motion sensors, sensor event coverage program 108 can continuously receive device sensor data from each active sensor to identify additional anomalies and movement patterns to further update the engagement profiles. This continued machine learning process allows for sensor event coverage program 108 to update the engagement profiles for different times of the year, where different times of the year can affect how the sensors in the sensor network are activated and deactivated to provide the required event coverage while maintaining energy conservation. In another example, sensor event coverage program 108 activates and deactivates temperature sensors in a crop field according to engagement profiled created for every day of the year, since seasonal and solar patterns change daily affecting an activation of temperature sensors in the crop field. As sensor event coverage program 108 utilizes the engagement profiles for the temperature sensors, sensor event coverage program 108 can continuously receive device sensor data from each active sensor to identify additional anomalies and movement patterns to further update the engagement profiles. This continued machine learning process allows for sensor event coverage program 108 to update the engagement profiles for any newly introduced variables (e.g., structure that affects a solar pattern) into the environment (i.e., crop field) that can affect the data acquired by the temperature sensors.

Figure 3A:
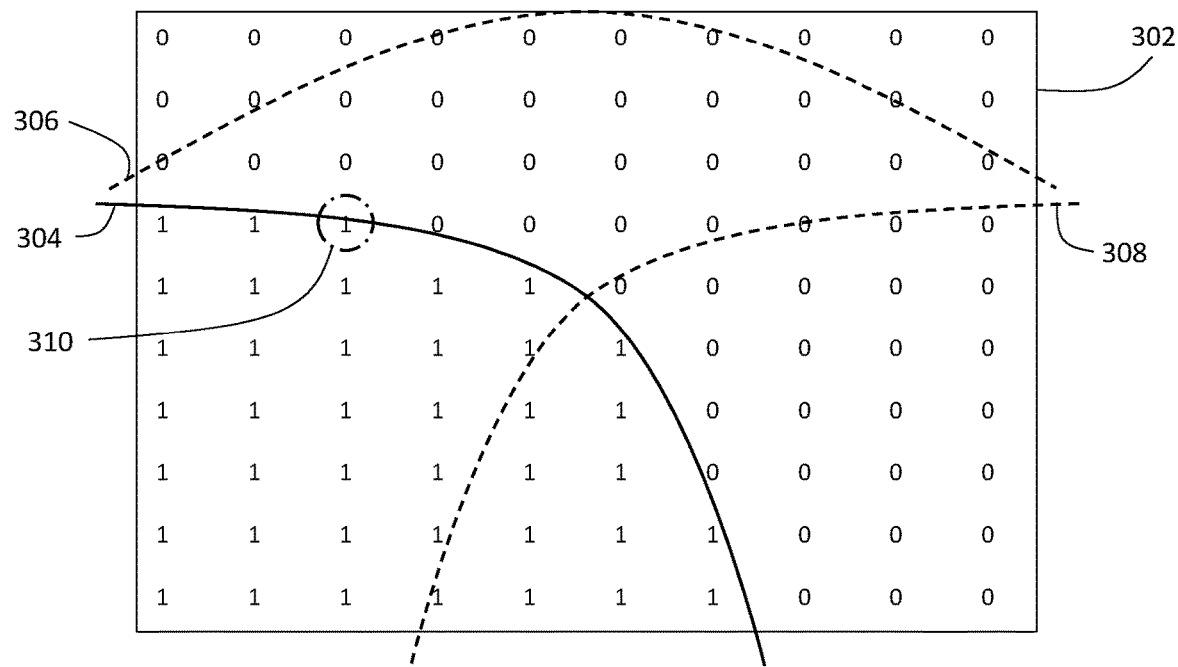
FIG. 3A illustrates an example of an active engagement pattern at time(n) for sensor network event coverage by the sensor event coverage program, in accordance with an embodiment of the present invention.

FIG. 3A illustrates an example of an active engagement pattern at time(n) for sensor network event coverage by the sensor event coverage program, in accordance with an embodiment of the present invention. In this embodiment, sensor event coverage program 108 activates various temperature sensors in the sensor network, where each temperature sensor is associated with activating an electronically controlled water valve in an irrigation system. If a temperature reading for a temperature sensor is at or above a threshold value (e.g., X≥25° C.), an electronically controlled water valve associated with the temperature sensor opens to ensure the soil in a portion of the crop field in the vicinity of the temperature sensor with the temperature reading above the threshold value maintains a certain moisture level. If a temperature reading for a temperature sensor below a threshold value (e.g., X<25° C.), an electronically controlled water valve associated with the temperature sensors closes. To ensure the temperature sensors in the sensor network do not continuously consume power by acquiring data, sensor event coverage program 108 utilizes engagement profiles to activate and deactivate temperature sensors in the sensor network for data value matrix 302. In this example, an activate temperature sensor is represented by "1" and a nonactive temperature sensor is represented by "0". Through multiple iterations of the machine learning process, sensor event coverage program 108 established engagement profile 304 for time(n), engagement profile 306 for time(n+1), and engagement profile 308 for time(n+2).

Sensor event coverage program 108 previously identified anomalies and movement patterns for the temperature sensors in the sensor network. In this example, engagement profiles 304, 306, and 308 each represent movement patterns for the sensor network and data value matrix 302 represents the crop field, where each movement pattern is associated with a solar pattern on the crop field. At time(n) (e.g., 8 AM on June $1^{st}$), an edge of a solar pattern on the crop field is represented by engagement profile 304, where temperature sensors located within the edge of the solar pattern represented by engagement profile 304 are active and temperature sensors located outside the edge of the solar pattern represented by engagement profile 304 are inactive. Sensor event coverage program 108 previously determined the movement pattern is associated with a solar pattern, where a temperature sensor exposed to solar rays (direct or indirect) experiences a rapid increase in temperature readings. As result, the temperature can rapidly exceed (e.g., 5 minutes) the threshold value (e.g., X<25° C.), once covered by the solar pattern and exposed to the solar rays. For temperature sensor 310 located on the edge of engagement profile 304, sensor event coverage program 108 takes into account an initialization and calibration period (e.g., 30 seconds) of temperature sensor 310 and instructs temperature sensor 310 to active prior to being exposed to the solar rays under the solar pattern.

Figure 3B:
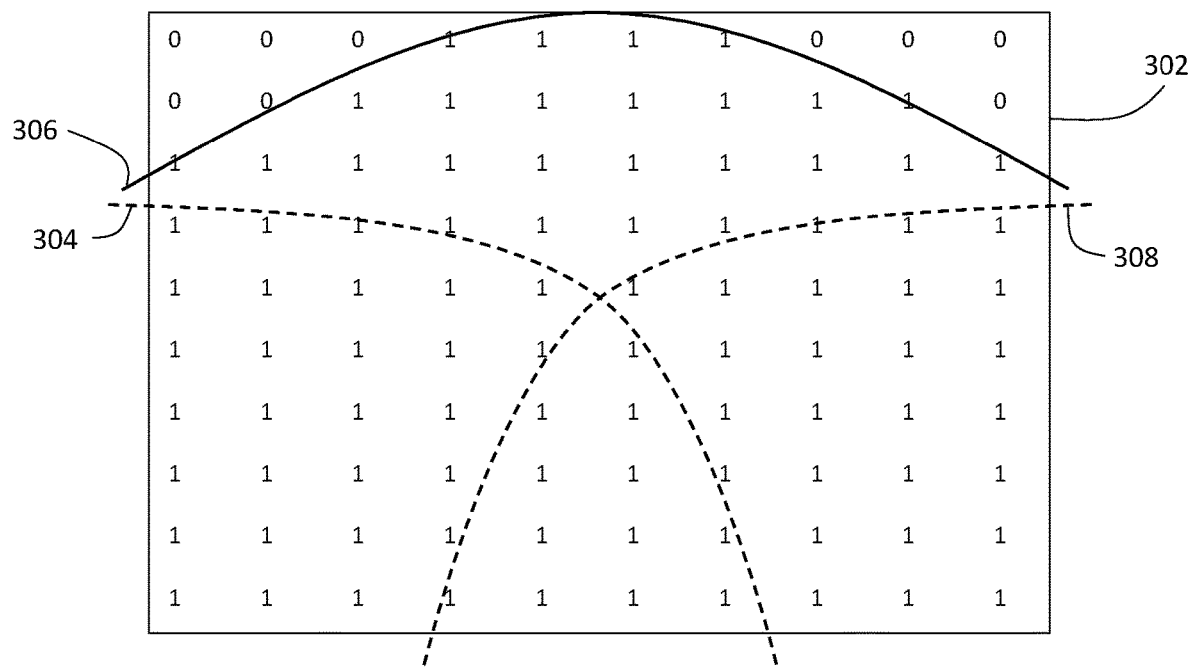
FIG. 3B illustrates an example of an active engagement pattern at time(n+50) for sensor network event coverage by the sensor event coverage program, in accordance with an embodiment of the present invention.

FIG. 3B illustrates an example of an active engagement pattern at time(n+50) for sensor network event coverage by the sensor event coverage program, in accordance with an embodiment of the present invention. At time(n+50) (e.g., 12 PM on June $1^{st}$), an edge of a solar pattern on the crop field is represented by engagement profile 306, where temperature sensors located within the edge of the solar pattern represented by engagement profile 306 are active and temperature sensors located outside the edge of the solar pattern represented by engagement profile 306 are inactive. Though not illustrated in FIG. 3B, there are multiple engagement profiles for instances between time(n) and time(n+50), where the multiple engagement profiles provide the transition between engagement profile 304 to engagement profile 306.

Figure 3C:
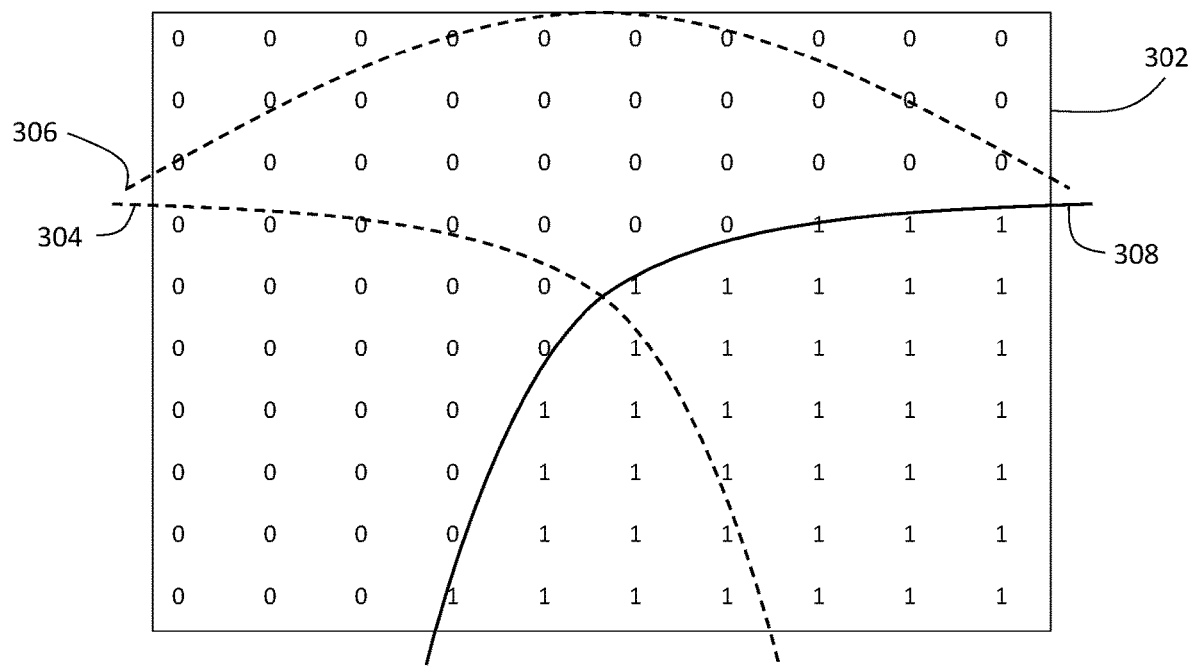
FIG. 3C illustrates an example of an active engagement pattern at time(n+100) for sensor network event coverage by the sensor event coverage program for a different season, in accordance with an embodiment of the present invention.

FIG. 3C illustrates an example of an active engagement pattern at time(n+100) for sensor network event coverage by the sensor event coverage program for a different season, in accordance with an embodiment of the present invention. At time(n+100) (e.g., 4 PM on June $1^{st}$), an edge of a solar pattern on the crop field is represented by engagement profile 308, where temperature sensors located within the edge of the solar pattern represented by engagement profile 308 are active and temperature sensors located outside the edge of the solar pattern represented by engagement profile 308 are inactive. It is to be noted, a portion of the temperature sensors in the sensor network indicated as active by engagement profiles 304 and 306, are no longer indicated as active by engagement profile 308. Though not illustrated in FIG. 3C, there are multiple engagement profiles for instances between time(n+50) and time(n+100), where the multiple engagement profiles provide the transition between engagement profile 306 to engagement profile 308.

Figure 4:
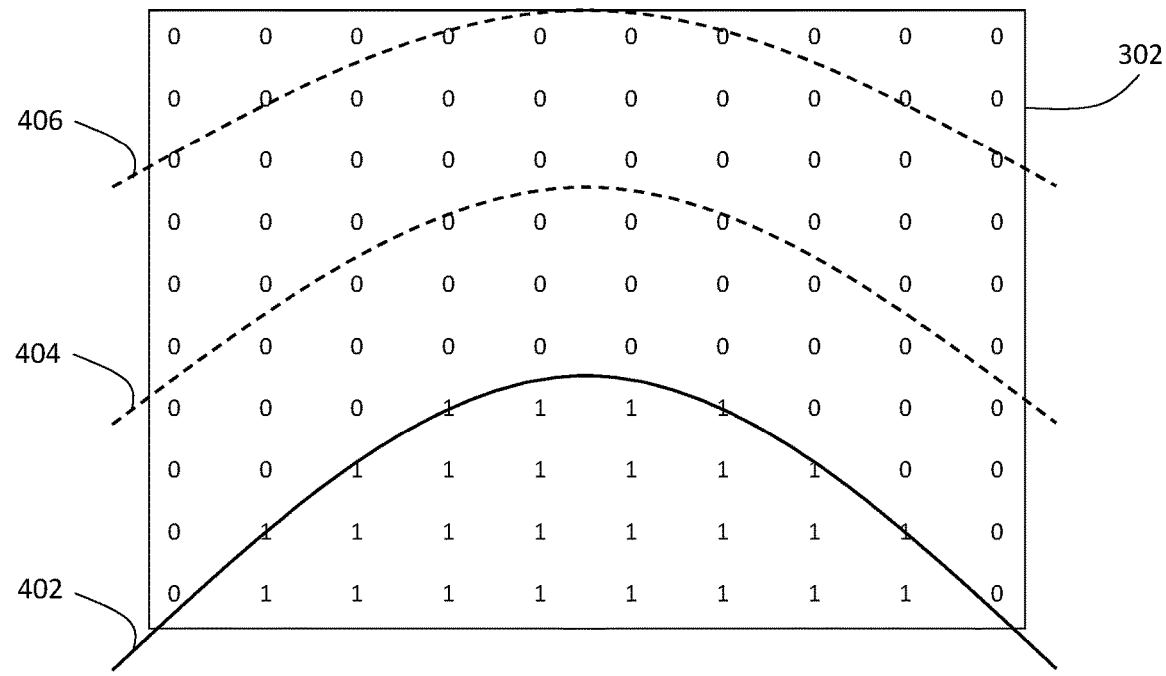
FIG. 4 illustrates an example of an active engagement pattern at time(n) for sensor network event coverage by the sensor event coverage program, in accordance with an embodiment of the present invention.

FIG. 4 illustrates an example of an active engagement pattern at time(n) for sensor network event coverage by the sensor event coverage program, in accordance with an embodiment of the present invention. Sensor event coverage program 108 utilizes engagement profiles to activate and deactivate temperature sensors in the sensor network for data value matrix 302 from FIGS. 3A-3C, but during a different time of year when a solar pattern is different compared to a solar pattern in FIGS. 3A-3C. An activate temperature sensor is represented by "1" and a nonactive temperature sensor is represented by "0". Through multiple iterations of the machine learning process, sensor event coverage program 108 established engagement profile 402 for time(n), engagement profile 404 for time(n+1), and engagement profile 406 for time(n+2), for the different time of year. Sensor event coverage program 108 previously identified anomalies and movement patterns for the temperature sensors in the sensor network. In this example, engagement profiles 402, 404, and 406 each represent movement patterns for the sensor network and data value matrix 302 represents the crop field, where each movement pattern is associated with a solar pattern on the crop field.

At time(n) (e.g., 8 AM on October $1^{st}$), an edge of a solar pattern on the crop field is represented by engagement profile 402, where temperature sensors located within the edge of the solar pattern represented by engagement profile 402 are active and temperature sensors located outside the edge of the solar pattern represented by engagement profile 402 are inactive. At time(n+50) (e.g., 12 PM on October $1^{st}$), an edge of a solar pattern on the crop field is represented by engagement profile 404, where temperature sensors located within the edge of the solar pattern represented by engagement profile 404 are active and temperature sensors located outside the edge of the solar pattern represented by engagement profile 404 are inactive. At time(n+100) (e.g., 4 PM on October $1^{st}$), an edge of a solar pattern on the crop field is represented by engagement profile 406, where temperature sensors located within the edge of the solar pattern represented by engagement profile 406 are active and temperature sensors located outside the edge of the solar pattern represented by engagement profile 406 are inactive. Sensor event coverage program 108 through iterative machine learning has the ability to identify the movement patterns with respect to time and establish for each temperature sensor in the sensor network engagement profiles 304, 306, 308, 402, 404, and 406 accordingly.

Figure 5:
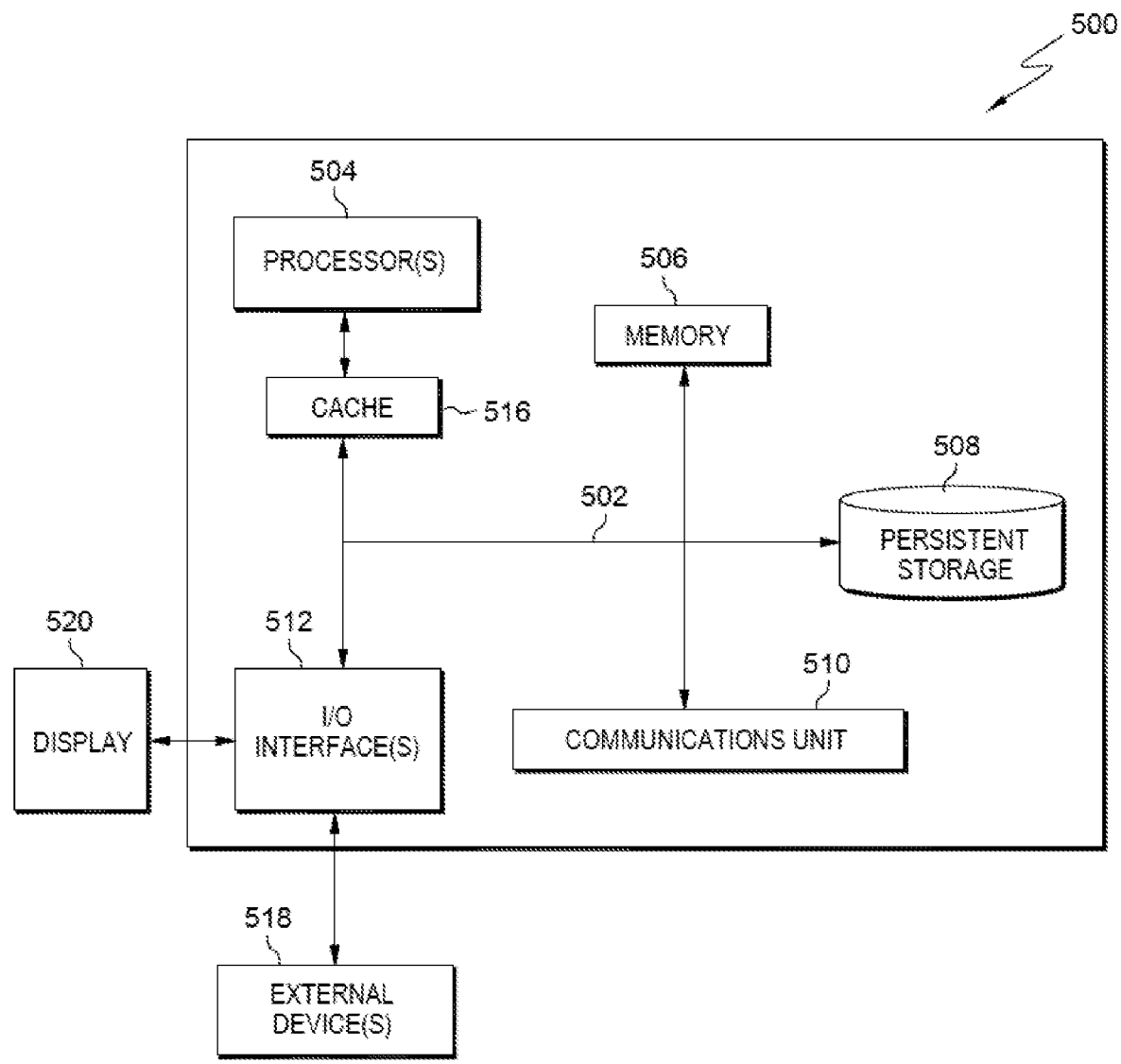
FIG. 5 depicts a block diagram of components of the server computer executing the sensor event coverage program within the distributed data processing environment of FIG. 1, in accordance with an embodiment of the present invention.

FIG. 5 depicts a computer system, where server computer 102 is an example of a computer system that can include sensor event coverage program 108. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
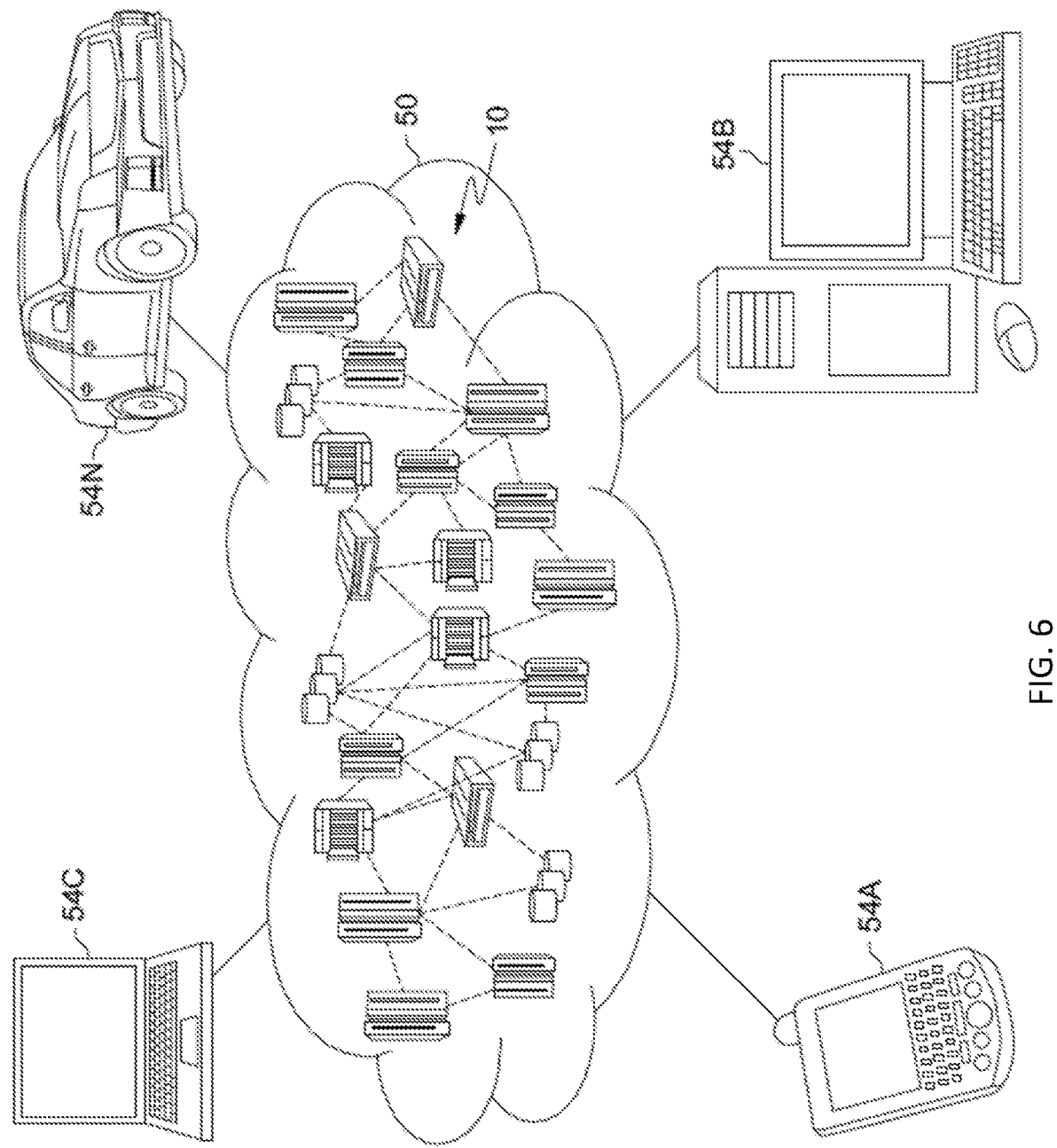
FIG. 6 depicts a cloud computing environment in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
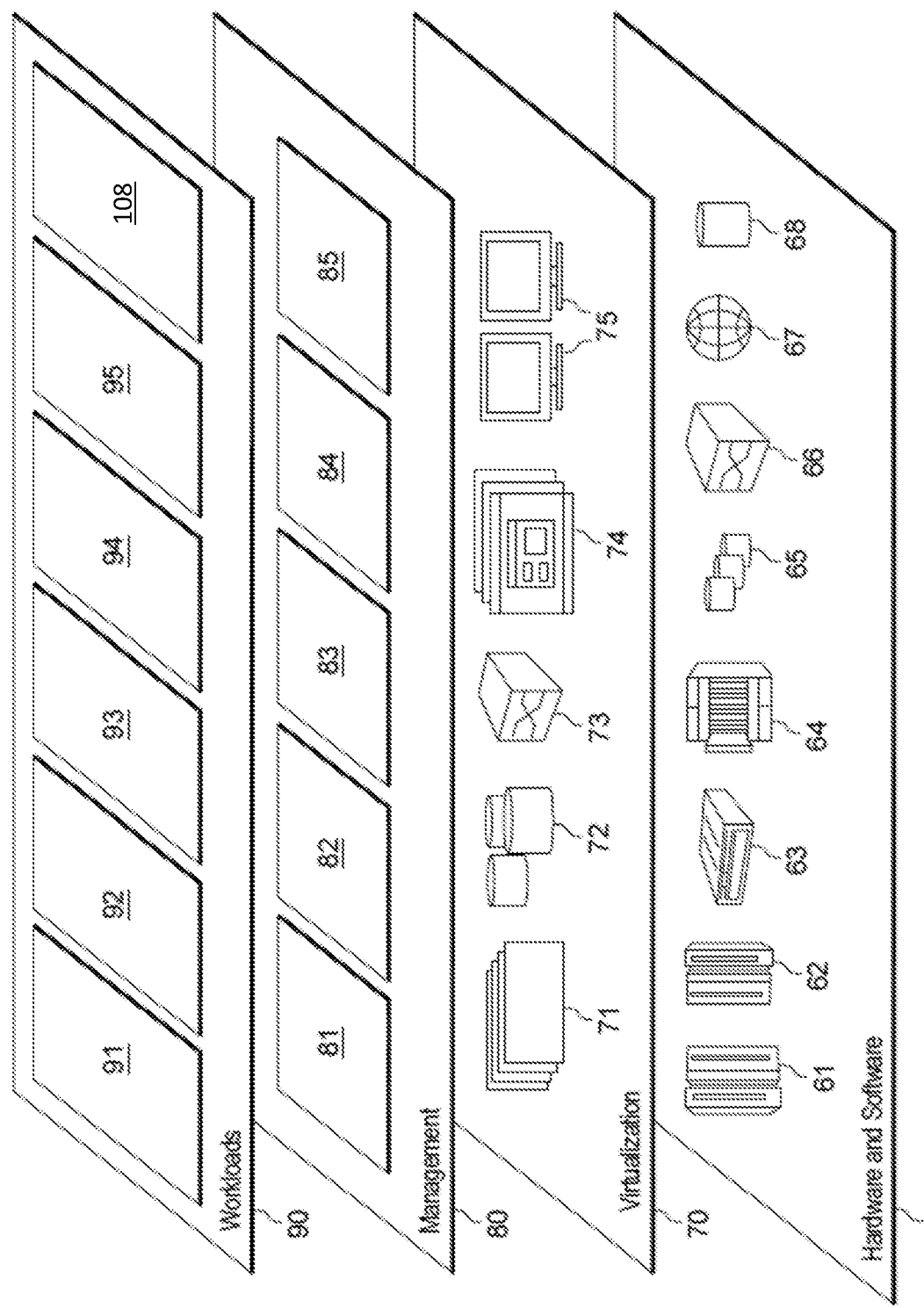
FIG. 7 depicts abstraction model layers in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensor event coverage program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, device sensor data for a plurality of sensors in a sensor network;
   identifying, by one or more processors, one or more anomalies in the device sensor data that indicate one or more sensors from the plurality of sensors were acquiring data during an event for a specific point in time;
   identifying, by one or more processors, movement patterns for the plurality of sensors based on the one or more anomalies; and
   responsive to updating base engagement profiles for the plurality of sensors based on the one or more anomalies and the movement patterns, activating, by one or more processors, based on the updated base engagement profiles, a first sensor from the plurality of sensors, wherein
   the base engagement profile is a time-based activation schedule and user defined activation preference for each sensor from the plurality of sensors.

2. The method of claim 1, further comprising:
   determining, by one or more processors, whether to initialize the updated engagement profiles for the sensor network utilizing a total iteration count for a machine learning process to determine whether enough device sensor data was received at various points in time for the plurality of sensors; and
   responsive to determining the total iteration count was reached, initializing, by one or more processors, the updated engagement profiles for the plurality of sensors in the sensor network.

3. The method of claim 1, further comprising:
   determining, by one or more processors, whether to initialize the updated engagement profiles for the sensor network utilizing a stabilization iteration count for a machine learning process, wherein the stabilization iteration count represents a number of instances the device sensor data was receive where there were no additional updates to the updated base engagement profiles; and responsive to determining the stabilation iteration count was reached, initializing, by one or more processors, the updated engagement profiles for the plurality of sensors in the sensor network.

4. The method of claim 1, wherein the device sensor data for the plurality of sensors in the sensor network includes data selected from the group consisting of:

an acquired sensor reading, an indication of activation, an operational state, a timestamp for the acquired sensor reading, and a location for the acquired sensor reading.

5. The method of claim 4, wherein the movement patterns represent instances of an activation of the one or more sensors from the plurality of sensors.

6. The method of claim 1, further comprising:

displaying, by one or more processors, a data matrix of the plurality of sensors representing an event coverage area, wherein a first engagement profile from the updated base engagement profiles is overlayed on the data matrix and includes the first sensor from the plurality of sensors.

7. A computer program product comprising:

one or more computer readable storage media and program instructions stored on at least one of the one or more storage media, the program instructions comprising:

program instructions to receive device sensor data for a plurality of sensors in a sensor network;

program instructions to identify one or more anomalies in the device sensor data;

program instructions to identify movement patterns for the plurality of sensors based on the one or more anomalies; and program instructions to responsive to updating base engagement profiles for the plurality of sensors based on the one or more anomalies and the movement patterns, activate based on the updated base engagement profiles, a first sensor from the plurality of sensors, wherein the base engagement profile is a time-based activation schedule and user defined activation preference for each sensor from the plurality of sensors.

8. The computer program product of claim 7, further comprising program instructions, stored on the one or more computer readable storage media, which when executed by a processor, cause the processor to:

determine whether to initialize the updated engagement profiles for the sensor network utilizing a total iteration count for a machine learning process to determine whether enough device sensor data was received at various points in time for the plurality of sensors; and responsive to determining the total iteration count was reached, initialize the updated engagement profiles for the plurality of sensors in the sensor network.

9. The computer program product of claim 7, further comprising program instructions, stored on the one or more computer readable storage media, which when executed by a processor, cause the processor to:

determine whether to initialize the updated engagement profiles for the sensor network utilizing a stabilization iteration count for a machine learning process, wherein the stabilization iteration count represents a number of instances the device sensor data was receive where there were no additional updates to the updated base engagement profiles; and responsive to determining the stabilization iteration count was reached, initialize the updated engagement profiles for the plurality of sensors in the sensor network.

10. The computer program product of claim 7, wherein the device sensor data for the plurality of sensors in the sensor network includes data selected from the group consisting of:

an acquired sensor reading, an indication of activation, an operational state, a timestamp for the acquired sensor reading, and a location for the acquired sensor reading.

11. The computer program product of claim 10, wherein the movement patterns represent instances of an activation of the one or more sensors from the plurality of sensors.

12. The computer program product of claim 7, further comprising program instructions, stored on the one or more computer readable storage media, which when executed by a processor, cause the processor to:

display data matrix of the plurality of sensors representing an event coverage area, wherein a first engagement profile from the updated base engagement profiles is overlayed on the data matrix and includes the first sensor from the plurality of sensors.

13. A computer system comprising;

one or more computer processors;

one or more computer readable storage media; and program instructions stored on the computer readable storage media for execution by at least one of the one or more computer processors, the program instructions comprising:

program instructions to receive device sensor data for a plurality of sensors in a sensor network;

program instructions to identify one or more anomalies in the device sensor data;

program instructions to identify movement patterns for the plurality of sensors based on the one or more anomalies; and program instructions to, responsive to updating base engagement profiles for the plurality of sensors based on the one or more anomalies and the movement patterns, activate based on the updated base engagement profiles, a first sensor from the plurality of sensors, wherein the base engagement profile is a time-based activation schedule and user defined activation preference for each sensor from the plurality of sensors.

14. The computer system of claim 13, further comprising program instructions, stored on the one or more computer readable storage media, which when executed by a processor, cause the processor to:

determine whether to initialize the updated engagement profiles for the sensor network utilizing a total iteration count for a machine learning process to determine whether enough device sensor data was received at various points in time for the plurality of sensors; and responsive to determining the total iteration count was reached, initialize the updated engagement profiles for the plurality of sensors in the sensor network.

15. The computer system of claim 13, further comprising program instructions, stored on the one or more computer readable storage media, which when executed by a processor, cause the processor to:

determine whether to initialize the updated engagement profiles for the sensor network utilizing a stabilization iteration count for a machine learning process, wherein the stabilization iteration count represents a number of instances the device sensor data was receive where there were no additional updates to the updated base engagement profiles; and responsive to determining the stabilization iteration count was reached, initialize the updated engagement profiles for the plurality of sensors in the sensor network.

16. The computer system of claim 13, wherein the device sensor data for the plurality of sensors in the sensor network includes data selected from the group consisting of: an acquired sensor reading, an indication of activation, an operational state, a timestamp for the acquired sensor reading, and a location for the acquired sensor reading.

17. The computer system of claim 13, further comprising program instructions, stored on the one or more computer readable storage media, which when executed by a processor, cause the processor to:

display data matrix of the plurality of sensors representing an event coverage area, wherein a first engagement profile from the updated base engagement profiles is overlayed on the data matrix and includes the first sensor from the plurality of sensors.

\* \* \* \* \*